United States Patent
Babin et al.

(10) Patent No.: US 7,029,269 B2
(45) Date of Patent: Apr. 18, 2006

(54) IN-LINE VALVE GATED NOZZLE

(75) Inventors: Denis Babin, Georgetown (CA); George Olaru, Toronto (CA)

(73) Assignee: Mold-Masters, Limited, Ontario (CA)

( * ) Notice: Subject to any disclaimer, the term of this patent is extended or adjusted under 35 U.S.C. 154(b) by 294 days.

(21) Appl. No.: 10/716,827

(22) Filed: Nov. 20, 2003

(65) Prior Publication Data

US 2004/0131721 A1    Jul. 8, 2004

Related U.S. Application Data

(60) Provisional application No. 60/427,924, filed on Nov. 21, 2002.

(51) Int. Cl.
*B29C 45/23* (2006.01)

(52) U.S. Cl. .................................. 425/564; 425/566

(58) Field of Classification Search ............... 425/562, 425/563, 564, 565, 566
See application file for complete search history.

(56) References Cited

U.S. PATENT DOCUMENTS

| | | |
|---|---|---|
| 3,553,788 A | 1/1971 | Putkowski |
| 4,902,218 A | 2/1990 | Leonard et al. |
| 5,004,416 A | 4/1991 | Van Den Brink |
| 5,049,062 A | 9/1991 | Gellert |
| 5,067,893 A | 11/1991 | Osuna-Diaz |
| 5,360,333 A | 11/1994 | Schmidt |
| 5,411,392 A | 5/1995 | Von Buren |
| 5,830,524 A | 11/1998 | Braun |
| 5,973,296 A | 10/1999 | Juliano et al. |
| 6,086,356 A | 7/2000 | Yu |
| 6,280,177 B1 | 8/2001 | Döbler |
| 6,328,554 B1 * | 12/2001 | Lausenhammer et al. ... 425/564 |
| 6,358,039 B1 * | 3/2002 | Manner et al. ............. 425/564 |

FOREIGN PATENT DOCUMENTS

| | | |
|---|---|---|
| DE | 42 30 758 | 3/1994 |
| EP | 0 963 829 | 12/1999 |

(Continued)

OTHER PUBLICATIONS

***EWIKON needle valve nozzle with absolutely symmetrical melt flow.

(Continued)

*Primary Examiner*—Tim Heitbrink
(74) *Attorney, Agent, or Firm*—Sterne, Kessler, Goldstein & Fox P.L.L.C.

(57) ABSTRACT

A nozzle is provided for an injection molding apparatus. The injection molding apparatus includes a mold block. The mold block defines at least one mold cavity that has a gate. The nozzle includes a nozzle body, a valve pin, an actuator, a first heating element and a second heating element. The nozzle body defines a nozzle body melt channel that is in fluid communication with and downstream from a melt source and that is in fluid communication with and upstream from the gate. The valve pin includes an upstream portion that defines a valve pin melt channel, wherein the valve pin melt channel has an inlet and at least one outlet. The inlet and the at least one outlet are in fluid communication with the nozzle body melt channel. The valve pin further includes a tip piece connected to the upstream portion. The valve pin is movable in the nozzle body melt channel for controlling the melt flow through the gate. The actuator is operatively connected to the valve pin to move the valve pin between the open and closed positions. The first heating element is thermally connected to the upstream portion of the valve pin. The second heating element is thermally connected to the nozzle body.

54 Claims, 6 Drawing Sheets

FOREIGN PATENT DOCUMENTS

JP 2005041020 A 2/2005

OTHER PUBLICATIONS

Borada Engineering Inc. Non Planar Surfaces.
OHM Craft New Heater maker is sure to warm the hearts of designers.
Waltow Electric Manufacturing Co. Thick Film Manifold Heaters Help Deliver Hot Runner Precision.
Watlow Electric Manufacturing Co. Improve Part Quality and Reduce Cycle Time with Thick Film Nozzle Heating Technology.

* cited by examiner

IN-LINE VALVE GATED NOZZLE

This Application is a nonprovisional of 60/427,924 filed Nov. 21, 2002.

FIELD OF THE INVENTION

This invention relates to an injection molding apparatus, and more particularly to an in-line valve gated nozzle for an injection molding apparatus.

BACKGROUND OF THE INVENTION

In many injection molding operations, there is a need to utilize a movable valve pin to open and close a gate into a mold cavity in order to control the melt flow into the mold cavity. In many cases, an in-line configuration is desired for the tip piece actuator. An in-line configuration means that the tip piece itself and the movement of the tip piece is generally co-axial, or in-line, with the melt channel in the nozzle. For some injection molding apparatus applications, however, the placement of the actuator may be restricted, so that it must be positioned in the space of the nozzle itself. Example nozzles where the actuator's positioning is in the nozzle space include U.S. Pat. No. 3,553,788 (Putkowski) and U.S. Pat. No. 5,830,524 (Braun).

Both the nozzles of Putkowski and Braun incorporate a piston that surrounds the nozzle body and that is operatively connected to a tip piece in the nozzle body melt channel. A challenge with such nozzles however, is how to get sufficient heating to the melt in all portions of the nozzle due to obstructions caused by the components that connect the actuator outside the nozzle body melt channel to the valve pin inside the melt channel.

In general, the portions of the nozzle where a heater is particularly beneficial are at the points where the nozzle contacts other components of the injection molding apparatus. This is because, at these contact points, heat that is intended for the melt can be conducted undesirably into these other components. Thus, at the top of the nozzle where the nozzle contacts the manifold or the melt source, and particularly at the bottom of the nozzle where the nozzle contacts the mold block, it is desirable to impart more heat to the nozzle than elsewhere along the length of the nozzle where no contact is made with other injection molding apparatus components.

Putkowski connects the piston to a tube that is movable within a guide tube. The tube has a melt channel therethrough and has a torpedo-like piece at its end. The torpedo-like piece closes the gate when the piston moves the tube forward. A heater is provided around the tube along a portion of the tube's length. Unfortunately, the configuration of Putkowski prevents the heater from extending along the entire length of the tube and more particularly, from being positioned at either end of the nozzle. The heater is not positioned near the gate where heating is critical due to heat loss into the mold block. Furthermore, the heater is also not positioned near the nozzle inlet, where heat loss occurs to the components contacting the nozzle inlet. The heater is only positioned in the central portion of the nozzle, which is the portion where heat is typically least required.

Braun attempts to resolve the problem by using a different configuration entirely. Braun incorporates a piston connected to a sliding element which is connected to a valve pin at the bottom. The sliding element itself surrounds a stationary tube which contains a melt channel. Braun includes a heating element within the melt channel. The heating element extends along the melt channel so that the effective melt channel is annular with the heater at its center. Thus, along a significant portion of the length of the nozzle, the melt is heated from the inside of the melt flow, instead of being heated from the outside.

Unfortunately, there are several problems with heating the melt from the inside. The creation of an annular flow path around the heater makes for a higher pressure drop for a given flow rate. This is because a greater fraction of the melt flowing in an annular melt channel is in contact with a wall (either the inside or the outside wall of the annular flow channel) and is thus subject to increased frictional forces relative to melt in a cylindrical melt channel.

Furthermore, by incorporating the heating element inside the melt channel, the outer diameter of the melt channel must be enlarged so as not to adversely affect the flow rate therethrough. Furthermore, the sliding element, which is positioned outside the melt channel increases the overall diameter of the nozzle assembly. Thus, the overall nozzle assembly diameter is large, limiting the number of nozzles that can be positioned on an injection molding apparatus of a given size, and thereby limiting the rate that the injection molding apparatus can produce parts.

Furthermore, heating melt from the inside can cause a stationary layer of cold melt to build up on the outer wall of the annular melt channel. This stationary layer can cause problems such as contamination of new melt after a material changeover in the melt, eg. a colour changeover. Thus, the stationary layer may need to be cleaned out between material changeovers, which can be time-consuming.

Thus, there is a continuing need for a new nozzle with improved heating of melt flowing therethrough, in particular for an in-line valve gated injection molding apparatus.

SUMMARY OF THE INVENTION

In a first aspect the invention is directed to a nozzle for an injection molding apparatus. The injection molding apparatus includes a mold block. The mold block defines at least one mold cavity that has a gate. The nozzle includes a nozzle body, a valve pin, an actuator, a first heating element and a second heating element. The nozzle body defines a nozzle body melt channel that is adapted to be in fluid communication with and downstream from a melt source and that is adapted to be in fluid communication with and upstream from the gate. The valve pin includes an upstream portion that defines a valve pin melt channel, wherein the valve pin melt channel has an inlet and at least one outlet. The inlet and the at least one outlet are in fluid communication with the nozzle body melt channel. The valve pin further includes a tip piece connected to the upstream portion. The valve pin is movable in the nozzle body melt channel for controlling the melt flow through the gate. The actuator is operatively connected to the valve pin to move the valve pin. The first heating element is thermally connected to the upstream portion of the valve pin. The second heating element is thermally connected to the nozzle body.

In a second aspect the invention is directed to a nozzle for an injection molding apparatus. The injection molding apparatus includes a mold block. The mold block defines at least one mold cavity that has a gate. The nozzle includes a nozzle body, a valve pin, an actuator and a heating element. The nozzle body defines a nozzle body melt channel that is adapted to be in fluid communication with and downstream from a melt source and that is adapted to be in fluid communication with and upstream from the gate. The valve pin includes an upstream portion that defines a valve pin melt channel, wherein the valve pin melt channel has an inlet and at least one outlet. The inlet and the at least one outlet are in fluid communication with the nozzle body melt channel. The valve pin further includes a tip piece connected to the upstream portion. The valve pin is movable in the nozzle body melt channel for controlling the melt flow through the gate. The actuator is operatively connected to the valve pin to move the valve pin between the open and closed positions. The heating element is embedded within the upstream portion of the valve pin.

In a third aspect, the invention is directed to a nozzle for an injection molding apparatus. The injection molding apparatus includes a mold block. The mold block defines at least one mold cavity that has a gate. The nozzle includes a nozzle body, a valve pin, an actuator and a heating element. The nozzle body defines a nozzle body melt channel that is adapted to be in fluid communication with and downstream from a melt source and that is adapted to be in fluid communication with and upstream from the gate. The valve pin is movable in the nozzle body melt channel to control melt flow through the gate. The heating element is embedded within the valve pin.

The movement of the valve pin in the nozzles described above may be to control the melt flow in any way. For example, the movement may be between an open position wherein the tip piece is spaced from the gate to permit melt flow into the mold cavity, and a closed position, wherein the tip piece cooperates with the gate to prevent melt flow into the mold cavity.

In another aspect, the invention is directed to an injection molding apparatus incorporating at least one of the nozzles described above.

DESCRIPTION OF THE DRAWINGS

For a better understanding of the present invention and to show more clearly how it may be carried into effect, reference will now be made by way of example to the accompanying drawings, in which.

DESCRIPTION OF THE PREFERRED EMBODIMENTS

Figure 1A:
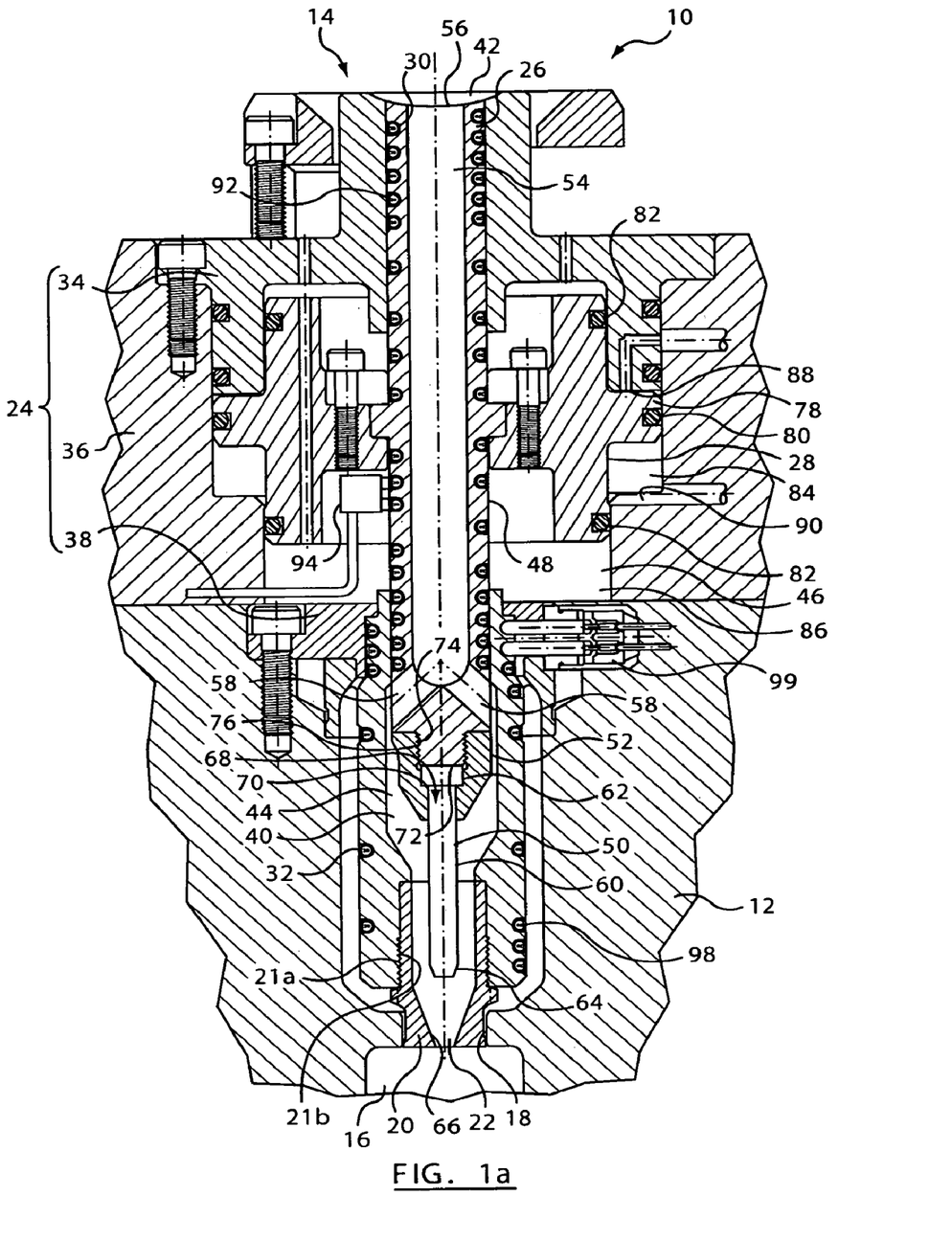
FIG. 1a is a sectional side view of an injection molding apparatus having an in-line valve gated nozzle in accordance with a first embodiment of the present invention, in the open position.
Figure 1B:
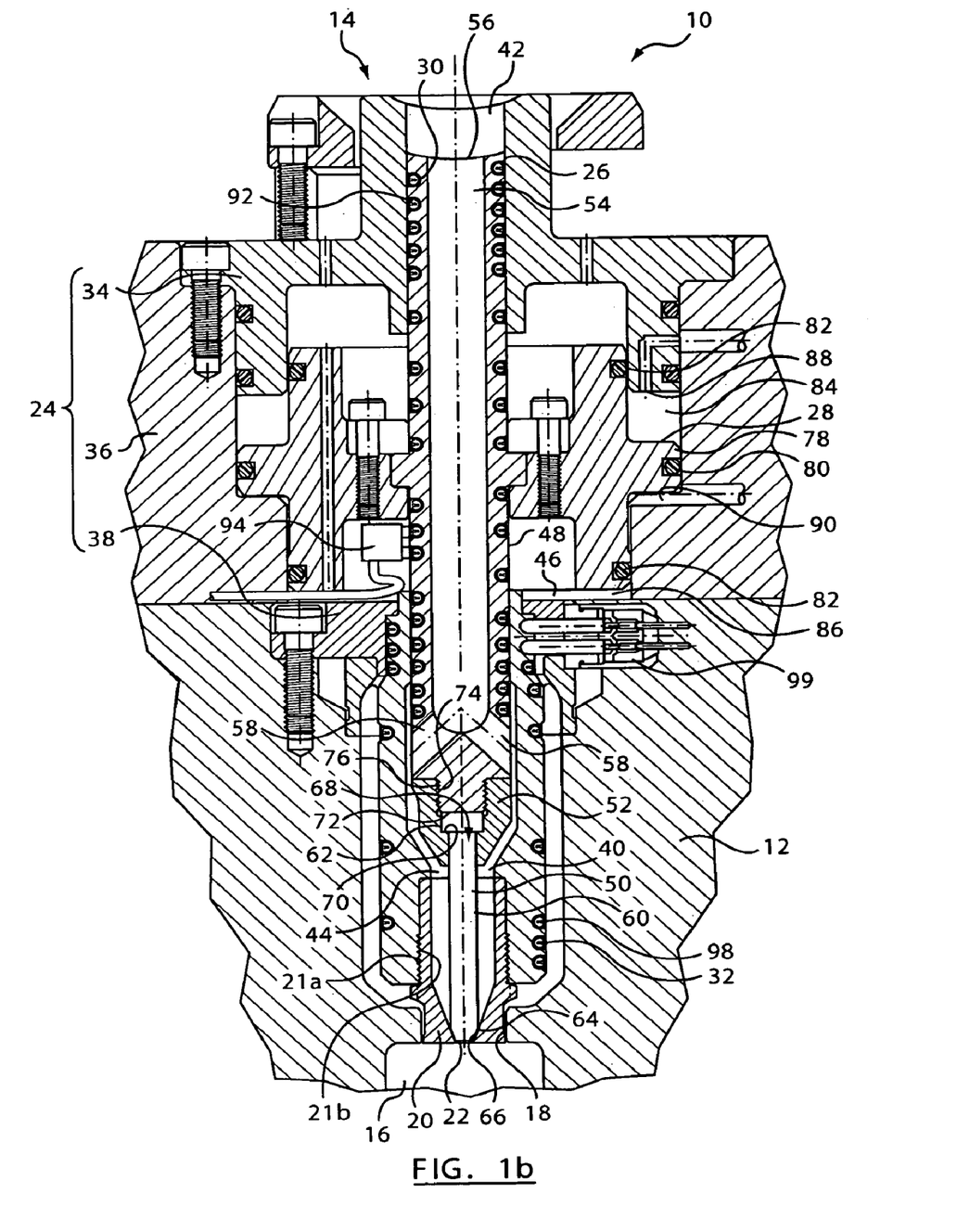
FIG. 1b is a sectional side view of the injection molding apparatus shown in FIG. 1a, with the nozzle in the closed position.

Reference is made to FIGS. 1a and 1b, which show an injection molding apparatus 10. The injection molding apparatus 10 includes a mold block 12 and a nozzle 14, in accordance with a first embodiment of the present invention.

The mold block 12 defines a mold cavity 16. The mold block 12 may include an aperture 18 into the mold cavity 16.

The aperture 18 is adapted for receiving a gate defining piece 20. The gate defining piece 20 defines a gate 22. In addition to forming part of the mold block 12, the gate defining piece 20 may also be connected to a component of the nozzle 14 and may thus concurrently form part of the nozzle 14. The connection as part of the nozzle 14 may be by means of first and second threaded portions 21a and 21b on the gate defining piece 20 and the nozzle 14 respectively. By connecting to both the mold block 12 and the nozzle 14, the gate defining piece 20 defines a melt flow path from the nozzle 14 to the mold cavity 16. As an alternative, the gate defining piece 20 may be attached to any other suitable component, such as being attached solely to the mold block 12.

The gate 22 may alternatively be defined in a mold plate that is part of the mold block 12 instead of being defined in the gate defining piece 20.

The gate defining piece 20 may alternatively be unconnected with the nozzle 14. In this alternative (not shown), the nozzle 14 may seal against the mold block 12 in any way known by a person skilled in the art to prevent melt leakage out of the injection molding machine.

A particular example of an injection molding apparatus is shown in the Figures. It will be appreciated that the injection molding apparatus that incorporates the nozzle of the present invention may be any suitable type of injection molding apparatus and is not limited to the example shown. For example, the injection molding apparatus 10 may include a different number of mold cavities 16 than are shown in the Figures. Furthermore, each mold cavity 16 may be provided with more than one gate 22.

The nozzle 14 transfers melt from a melt source (not shown) to the gate 22 and into the mold cavity 16. The nozzle 14 includes a nozzle body 24, a valve pin 26, an actuator 28, a first heating element 30 and a second heating element 32. The nozzle body 24 may comprise an assembly of several components, such as, for example, an upstream body portion 34, a mid-body portion 36 and a downstream body portion 38. The upstream body portion 34 defines an upstream body melt channel 42. The downstream body portion 38 defines a downstream body melt channel 44. Together, the upstream body melt channel 42 and the downstream body melt channel 44 make up a nozzle body melt channel 40.

The upstream and downstream body portions 34 and 38 may be spaced from each other. The mid-body portion 36 connects the upstream body portion 34 and the downstream body portion 38. A chamber 46 is defined in the mid-body portion 36 between the upstream and downstream body portions 34 and 38. The chamber 46 houses the actuator 28.

The valve pin 26 is positioned within the upstream body melt channel portion 42 and within the downstream body melt channel portion 44 and extends through the chamber 46 where the actuator operatively connects to it. The valve pin 26 includes an upstream valve pin portion 48 and a tip piece 50, and may include an optional retainer 52. The valve pin 26 is movable within the nozzle body melt channel 40 from a first position to a second position. For example, the valve pin 26 may be movable from an open position as shown in FIG. 1a, wherein the tip piece 50 is spaced from the gate 22, to a closed position as shown in FIG. 1b, wherein the tip piece 50 cooperates with the gate 22 to prevent melt from entering the mold cavity 16.

The upstream valve pin portion 48 extends from within the upstream body melt channel portion 42, through the chamber 46, and into the downstream body melt channel portion 44. The upstream valve pin portion 48 defines a valve pin melt channel 54, which has an inlet 56 and which may have a plurality of outlets 58. Alternatively, the valve pin melt channel 54 may have a single outlet 58.

The inlet 56 of the valve pin melt channel 54 is in fluid communication with the upstream body melt channel portion 42. The outlets 58 of the valve pin melt channel 54 are in fluid communication with the downstream body melt channel portion 44.

The overall length of the upstream portion 48 of the valve pin 26 may be selected so that the upstream portion 48 occupies most of the length of the nozzle body melt channel 40. Thus the tip piece 50 may be configured to be relatively short.

The tip piece 50 includes a tip piece body 60 and may include an optional tip piece head 62. The tip piece body 60 may have any suitable shape, and may be for example, generally cylindrical. The tip piece body 60 includes a first gate sealing surface 64. The first gate sealing surface 64 cooperates with a second gate sealing surface 66, which may be positioned on the mold block 12 within or proximate to the gate 22.

The optional tip piece head 62 may have any shape that permits the tip piece 50 to be held mechanically in place to the upstream portion 48. For example, the tip piece head 62 may be shaped like a disc that has a diameter larger than that of the tip piece body 60.

The tip piece 50 is attached to the upstream portion 48. The tip piece 50 may be attached to the upstream portion 48 by any suitable means, such as, for example, the optional retainer 52. The retainer 52 may include a pass-through 68 through which the tip piece body 60 can extend. The retainer 52 includes a shoulder 70, against which the tip piece head 62 rests. When the retainer 52 is attached to the upstream portion 48 of the valve pin 26, the tip piece head 62 is pinned between a shoulder 72 on the upstream portion 48 and the shoulder 70 on the retainer 52. An advantage of having the tip piece 50 be removably connected to the upstream portion 48 is that the tip piece 50 is more likely to incur wear during operation of the injection molding apparatus 10 than is the upstream portion 48. Thus, the tip piece 50 can be replaced when necessary without necessitating the replacement of the upstream portion 48 also.

It is alternatively possible, however, for the tip piece 50 to be integrally attached to the upstream portion 48, so that they form a single unit.

The retainer 52 may be removably attached to the upstream portion by any suitable means, such as, for example, by a first threaded portion 74 which mates with a corresponding second threaded portion 76 on the upstream portion 48 of the valve pin 26.

The actuator 28 may be any suitable type of actuator that moves the valve pin 26 linearly in the nozzle body melt channel 40. For example, the actuator 28 may include a piston 78 that is actuated by a fluid. The piston 78 may be movable within the chamber 46 and is operably connected to the valve pin 26. The piston 78 includes a first seal 80 to seal against a wall of the chamber 46 to prevent leakage of the actuation fluid therepast.

The piston 78 may also include a pair of second seals 82 which separate the chamber 46 into a first portion 84 that is exposed to the actuating fluid, and a second portion 86 that is not exposed to the actuating fluid. The second seals 82 separate the first portion 84 from the valve pin 26 to inhibit the actuating fluid from mixing with melt in the nozzle 14.

The actuating fluid may be any suitable actuating fluid, such as, for example, air or a hydraulic oil. The actuating fluid may enter and leave the chamber 46 by means of ports 88 and 90.

The first heating element 30 is at least thermally connected to the valve pin 26. In the embodiment shown in FIGS. 1a and 1b, the first heating element 30 is a wire element 92 that is wrapped around the upstream portion 48 of the valve pin 26. The wire element 92 may be a coil type or may be a simple uncoiled wire.

The wire element 92 may be embedded within the upstream portion 48 of the valve pin 26. For the purposes of this disclosure, the term, embedded, refers to any type of connection whereby the portion of the component in which the wire element 92 is embedded can be slidably received in an aperture, such as, for example, the nozzle body melt channel 40. The embedded wire element 92 may or may not be flush with the exterior surface of the component in which it is embedded.

The wire element 92 is connected to an electrical power source (not shown). A terminal 94 may be connected between the wire element 92 and the electrical power source (not shown).

The wire element 92 may have a wrap density that is higher along portions of the upstream portion 48 and lower along other portions of the upstream portion 48. For example, the wrap density of the wire element 92 may be relatively high at the inlet end of the nozzle 14, where heat loss is relatively high.

The wire element 92 may enter and exit the upstream portion 48 at any suitable point. For example, the wire element 92 may enter and exit the upstream portion 48 within the chamber 46, along a part of the upstream portion 48 that remains in the chamber 46 through the range of movement of the valve pin 26.

Alternatively, the wire element 92 may enter and exit the upstream portion 48 through a suitably large slot (not shown) in the upstream body portion 34 of the nozzle body 24.

An advantage obtained by embedding the wire element 92 in the upstream portion 48 of the valve pin 26, is that a greater portion of the length of the nozzle 14 can be heated directly from that first heating element 30 alone, than is accomplished with single heater configurations shown in the prior art.

For the purposes of this disclosure, a heating element heats primarily the immediately adjacent sectional volume of melt in the nozzle 14. It is recognized that other portions of the melt outside of the immediately adjacent sectional volume can also be heated by the heating element, however, the heating that occurs in those areas is relatively lower.

The first heating element 30 may alternatively be a sleeve-type heating element that is externally mounted on the upstream portion 48. In this case, the heating element would only cover the portion of the upstream portion 48 that always remains in the chamber 46 throughout the range of motion of the valve pin 26.

The second heating element 32 is connected to the downstream portion 38 of the nozzle body 24, to heat melt therein. In the embodiment shown in FIGS. 1a and 1b, the second heating element 32 comprises a wire element 98 that is wrapped around the downstream body portion 38. The wire element 98 may be a coil type or may be a simple uncoiled wire. The wire element 98 may be embedded within the downstream body portion 38.

The wire element 98 is connected to an electrical power source (not shown). A terminal 99 may be connected between the wire element 98 and the electrical power source (not shown).

The wrap density of the wire element 98 may vary along the length of the downstream body portion 38 in any desired way. For example, the wire wrap density may be relatively high near the tip of the nozzle 14, and may be relatively lower upstream from there.

The second heating element 32 may overlap with the first heating element 30 so that, where they overlap they are both adapted to heat the same portion of the melt in the nozzle 14. Alternatively, they may be configured so that there is no overlap, but so that the second heating element 32 takes up heating of the melt where the first heating element 30 ends.

The first and second heating elements 30 and 32 are configured to heat substantially the entire length of the nozzle 14. Thus, a greater degree of control is obtained over the melt temperature particularly at the tip and at the nozzle inlet, relative to in-line systems where the valve pin only includes a single external heater.

Furthermore, the first and second heating elements 30 and 32 heat the melt from the outside. By heating the melt from the outside, several advantages are obtained. One advantage is that the overall diameter of the nozzle assembly is kept smaller than a comparable system with a heater inside the nozzle body melt channel 40. A second advantage to heating melt from the outside is that it avoids the build up of a stationary layer of cold melt, as explained earlier with respect to heating melt from the inside. A third advantage to heating the melt from the outside is that the overall pressure drop in the nozzle 14 is lower than an equivalent nozzle where the melt is heated from the inside, thus reducing the energy and pressure required to get melt from the melt source (not shown) to the mold cavity 16.

Figure 2A:
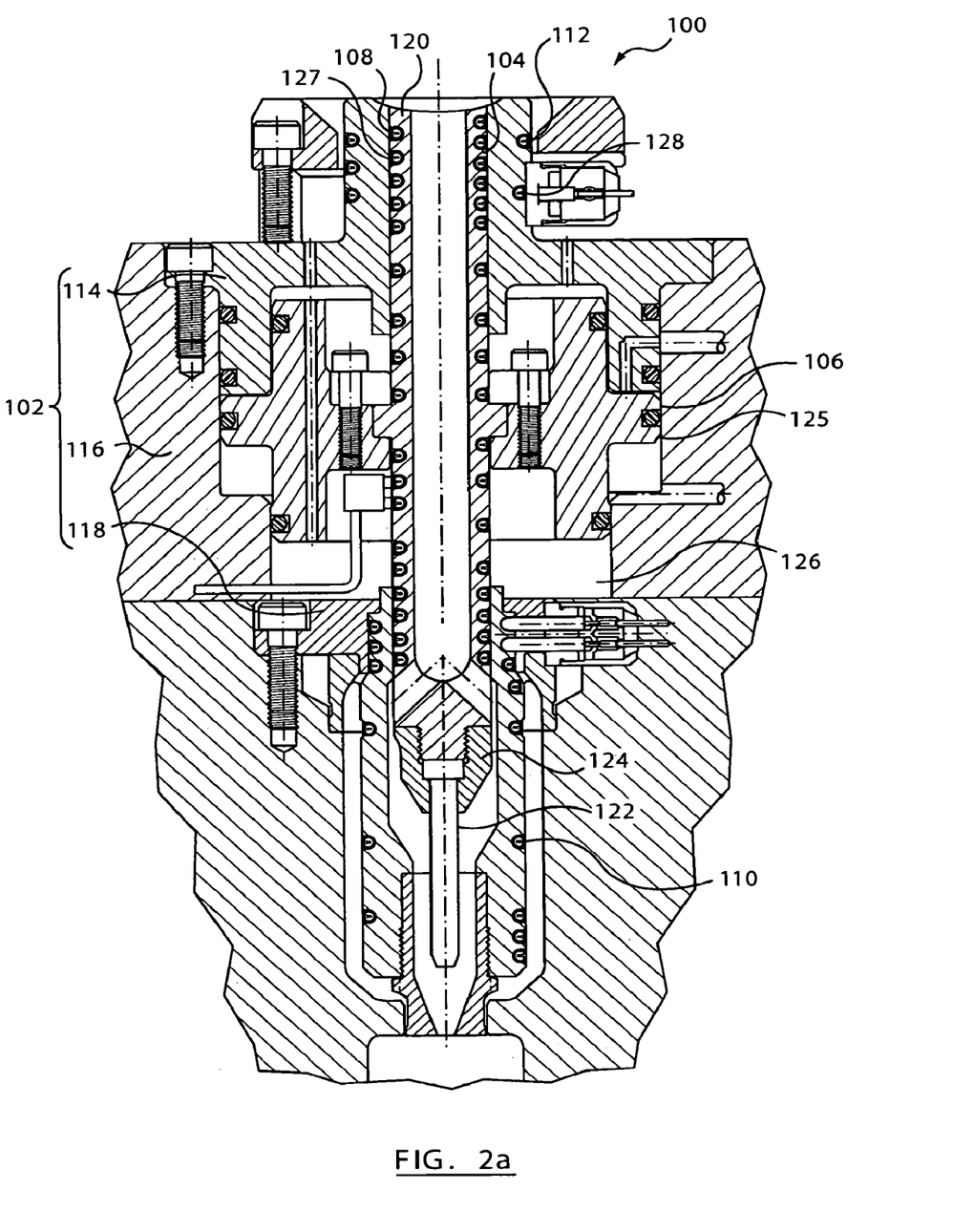
FIGS. 2a and 2b are sectional side views of an injection molding apparatus having an in-line valve-gated nozzle in accordance with an alternative embodiment of the present invention, with the nozzles in the open and closed positioned respectively.
Figure 2B:
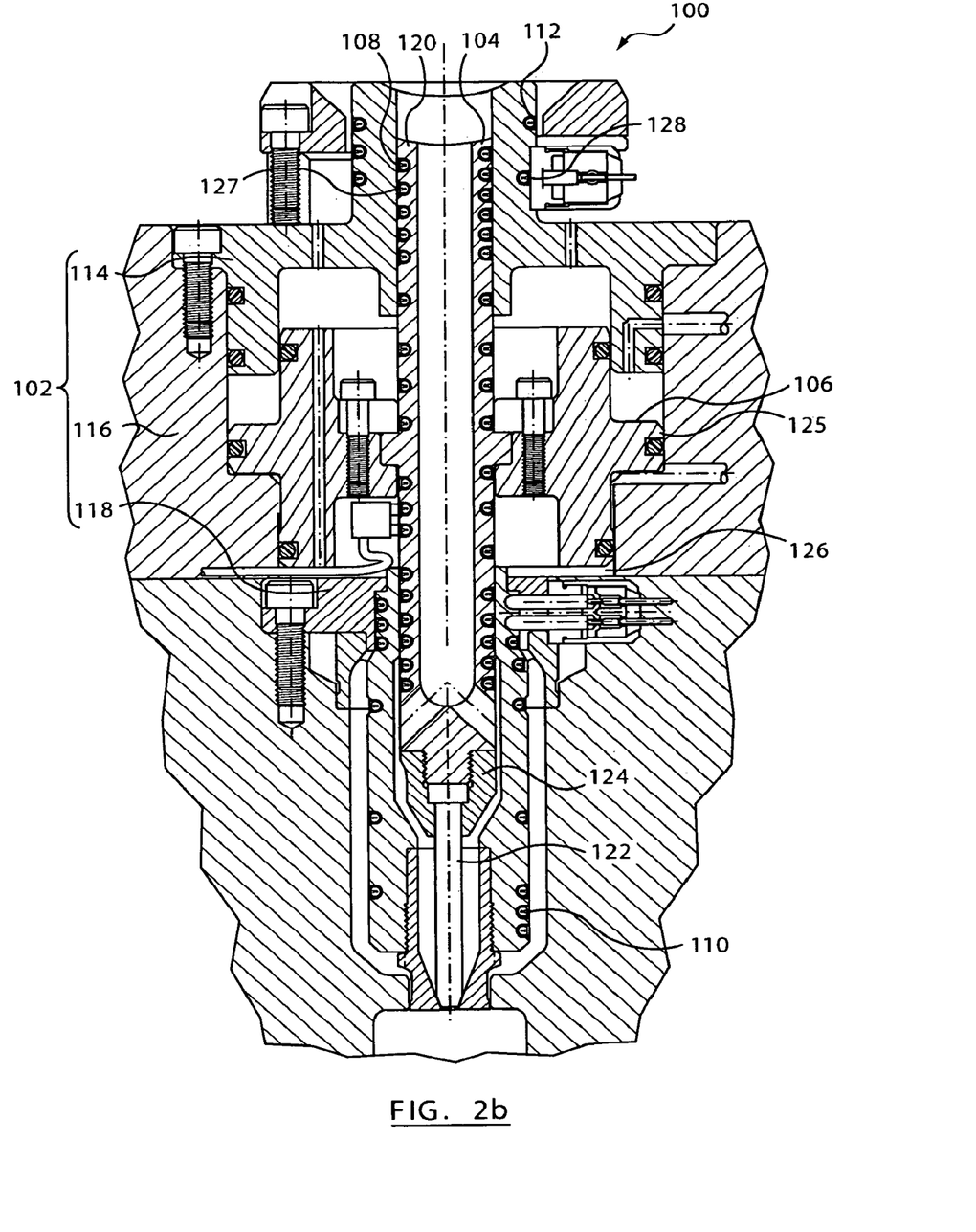

Reference is made to FIGS. 2a and 2b, which show a nozzle 100 in accordance with another embodiment of the present invention. The nozzle 100 may be similar to nozzle 14, and may include a nozzle body 102, a valve pin 104, an actuator 106, a first heating element 108, a second heating element 110, and a third heating element 112. The nozzle body 102 may be similar to the nozzle body 24 and may include an upstream body portion 114, a mid-body portion 116 and a downstream body portion 118, which may be similar to the upstream body portion 34, a mid-body portion 36 and a downstream body portion 38 respectively.

The valve pin 104 may be similar to the valve pin 26, and may include an upstream portion 120, a tip piece 122 and an optional retainer 124 which are similar to the upstream portion 48, the tip piece 50 and the retainer 52 respectively.

The actuator 106 may include a piston 125, which moves within a chamber 126, and may have a structure similar to that of the actuator 28.

The first heating element 108 is connected to the valve pin 104. The first heating element 108 may be any suitable type of heating element, such as a wire element 127. The wire element 127 may be a coiled type or an uncoiled type. The wire element 127 may wrap around the upstream portion 120 in a manner similar to the wire element 92 and may enter and exit the upstream portion 120 at any suitable location. Preferably, the wire element 127 enters and exits the upstream portion 120 in the chamber 126 at a point where it is not contacted by the actuator 106.

The first heating element 108 may alternatively be a sleeve-type heating element that is positioned externally on the upstream portion 120. In this case, the first heating element 108 would have to be positioned on the portion of the upstream portion 120 of the valve pin 104 that always remains in the chamber 126 throughout the range of movement of the valve pin 26.

The second heating element 110 may be similar to the second heating element 32, and may be connected to the downstream portion 118 of the nozzle body 102.

The third heating element 112 may be similar to the second heating element 110. The third heating element 112 is connected to the upstream portion 114 of the nozzle body 102. The third heating element 112 may be a wire element 128 that is wrapped around the upstream body portion 114. The wire element 128 may have a different wrap density along different portions of the upstream body portion 114. For example, the wire element 128 may have a relatively high wrap density near the inlet end of the nozzle 14, where heat loss is relatively high, and may have a lower wrap density away from the inlet end where heat loss is relatively lower. Furthermore, the third heating element 112 may overlap with the first heating element 108 in terms of the portion of the melt that is heated by each. However, the third heating element 112 is positioned at least partially upstream of the first heating element 108, at least when the valve pin 104 is in the closed position.

An advantage obtained by including the first, second and third heating elements 108, 110 and 112 is that substantially the entire length of the nozzle 100 can be heated regardless of the position of the valve pin 104. Another advantage is that in the nozzle 100, melt that is upstream from the upstream portion 120 of the valve pin 104, can be heated by means of the third heating element 112. Such a situation occurs as the valve pin 104 is moved from the position shown in FIG. 2a towards the closed position shown in FIG. 2b.

Figure 3:
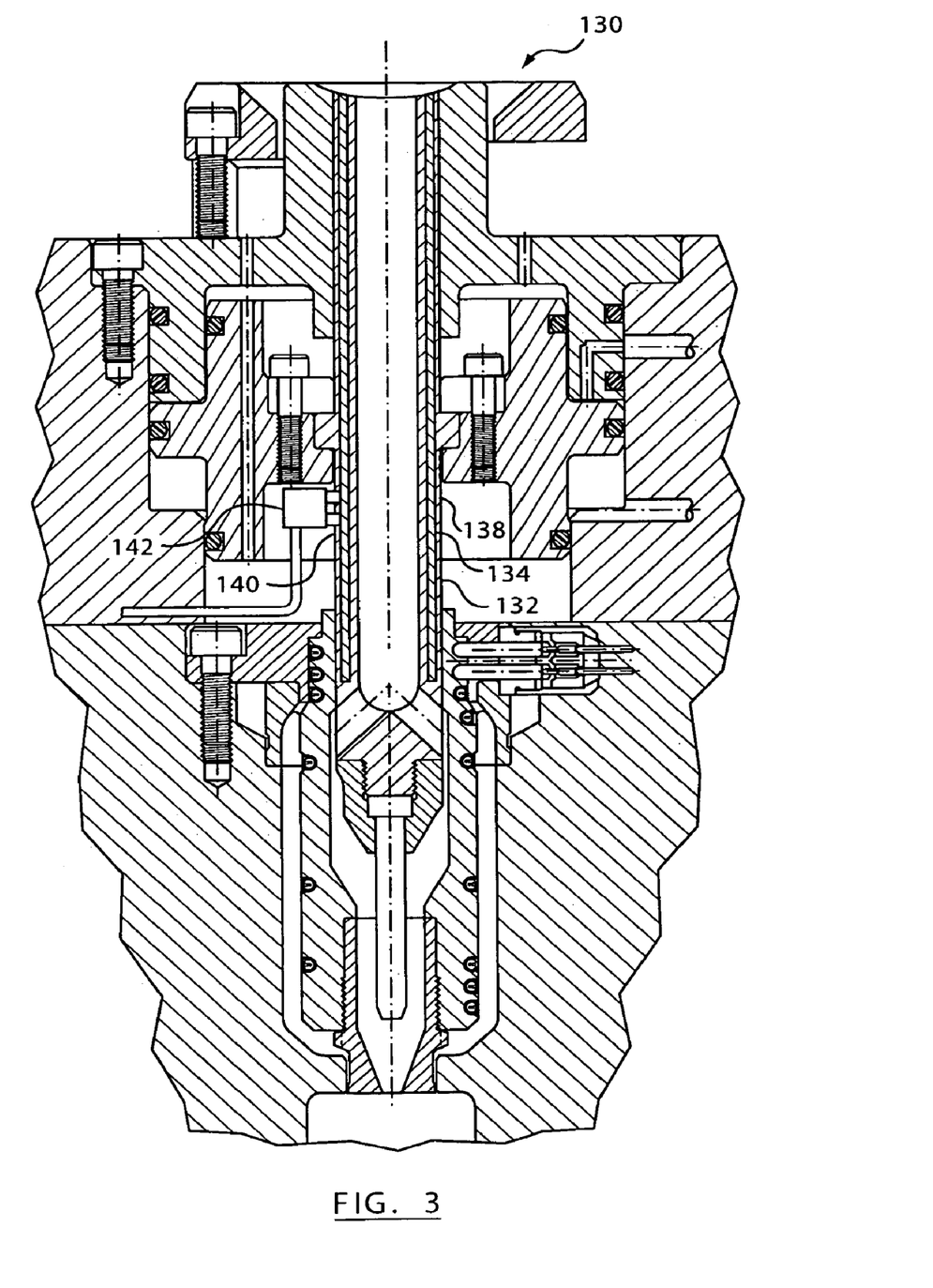
FIG. 3 is a sectional side view of a variant of the nozzle shown in FIG. 1.

Reference is made to FIG. 3, which shows a nozzle 130 in accordance with another embodiment of the present invention. The nozzle 130 may be similar to the nozzle 14, except that the nozzle 130 has a valve pin 132 with a film heating element 134 thereon, instead of a wrapped wire heater element as the first heating element.

Figure 3A:
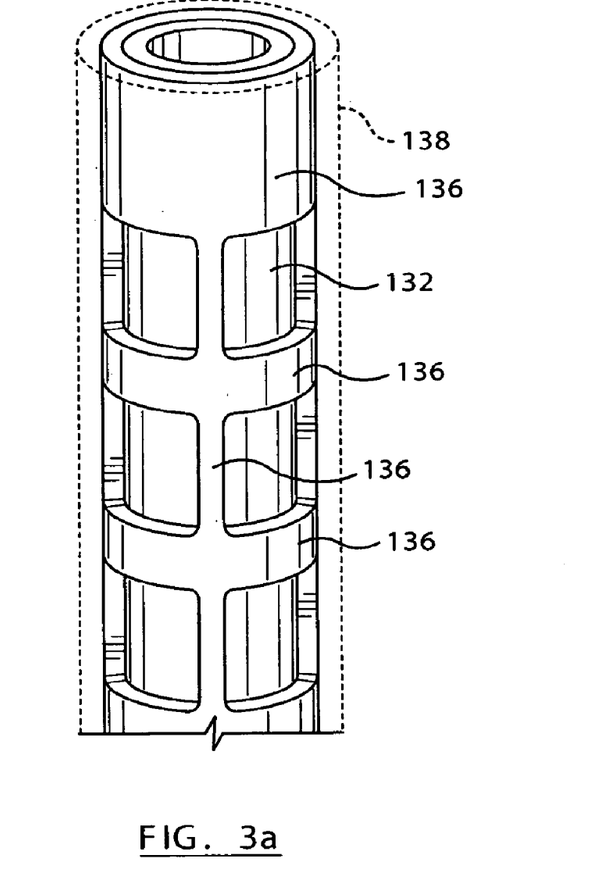
FIG. 3a is a perspective view of a portion of the nozzle shown in FIG. 3, with an outer layer shown as being transparent for clarity.

The film heating element 134 can be applied onto the body of the upstream portion of the valve pin 132 to form either a relatively complete layer so that heat is distributed relatively evenly over most or all of the upstream portion of the valve pin 132. Alternatively the film heating element 134 can be configured to form a series of thermal conduits 136 (see FIG. 3a) or bands in selected areas of the upstream portion of the valve pin 132, so that the heat is distributed more to selected regions of the valve pin 132 and less to other portions of the valve pin 132.

A protective sleeve 138 may be positioned over the film heating element 134, effectively embedding the film heating element 134 within the valve pin 132. The protective sleeve 138 protects the film heating element 134 from being abraded during movement of the valve pin 132 in the nozzle 130. The protective sleeve 138 may require an aperture 140 therethrough to permit the connection of the film heating element 134 to a terminal which is shown at 142, and to a source of power.

The film heating element 134 can replace a wire heating element as the second heating element 32, 110 (FIGS. 1a, and 2a respectively), and the third heating element 112 (FIG. 2a).

The actuator for the valve pin has been described as incorporating a piston that is movable by fluid pressure in a chamber. It is alternatively possible to incorporate any other suitable type of actuator for the valve pin. For example, the actuator may include a fluid actuated cylinder (eg. a pneumatic or hydraulic cylinder) that is connected to the valve pin by means of a suitable mechanical linkage.

The valve pin has been described as controlling the melt flow through the gate by movement between a first position wherein the valve pin permits melt flow through the gate into the mold cavity, and a second position wherein the valve pin cooperates with the gate to prevent melt flow therethrough. It is alternatively possible for the valve pin to control melt flow through the gate whereby movement between first and second positions permit melt flow into the mold cavity selectively at a first or a second flow rate. In other words, at a first position the melt flow would be at a first selected flow rate, and at the second position the melt flow would be at a second selected flow rate. In this alternative, some other means may be used to close the gate once it is desired to prevent melt flow through the gate, eg. when the mold cavity is opened for ejection of a molded article.

While the above description constitutes the preferred embodiments, it will be appreciated that the present invention is susceptible to modification and change without departing from the fair meaning of the accompanying claims.

The invention claimed is:

1. A nozzle for an injection molding apparatus, said injection molding apparatus including a mold block, said mold block defining at least one mold cavity having a gate, said nozzle comprising:
 a nozzle body, said nozzle body defining a nozzle body melt channel that is adapted to be in fluid communication with and downstream from a melt source and that is adapted to be in fluid communication with and upstream from said gate;
 a valve pin, said valve pin including an upstream portion, said upstream portion defining a valve pin melt channel, wherein said valve pin melt channel has an inlet and at least one outlet, wherein said inlet and said at least one outlet are in fluid communication with said nozzle body melt channel, said valve pin further includes a tip piece connected to said upstream portion, and wherein said valve pin is movable in said nozzle body melt channel to control melt flow through said gate;
 an actuator operatively connected to said valve pin to move said valve pin;
 a first heating element that is thermally connected to said upstream portion of said valve pin; and
 a second heating element that is thermally connected to said nozzle body.

2. A nozzle as claimed in claim 1, wherein said valve pin is movable between an open position wherein said tip piece is spaced from said gate to permit melt flow through said gate, and a closed position wherein said tip piece cooperates with said gate to prevent melt flow through said gate.

3. A nozzle as claimed in claim 2, wherein said second heating element is positioned downstream from said upstream portion of said valve pin.

4. A nozzle as claimed in claim 2, wherein a portion of said nozzle body melt channel is heated by both said first and second heating elements.

5. A nozzle as claimed in claim 2, wherein said first heating element surrounds said valve pin melt channel.

6. A nozzle as claimed in claim 2, wherein said second heating element surrounds said nozzle body melt channel.

7. A nozzle as claimed in claim 2, wherein said first heating element surrounds said valve pin melt channel, and wherein said second heating element surrounds said nozzle body melt channel.

8. A nozzle as claimed in claim 2, further comprising a third heating element connected to said nozzle body.

9. A nozzle as claimed in claim 8, wherein said first, second and third heating elements are adapted to heat substantially the entire length of said nozzle.

10. A nozzle as claimed in claim 8, wherein said third heating element is positioned at least partially upstream from said upstream portion of said valve pin when said valve pin is in said closed position.

11. A nozzle as claimed in claim 2, wherein said first heating element is embedded within said upstream portion of said valve pin.

12. A nozzle as claimed in claim 2, wherein said actuator includes a piston and a chamber, wherein said piston is movable within said chamber, and said piston is operatively connected to said valve pin so that movement of said piston within said chamber causes movement of said valve pin between said open and closed positions.

13. A nozzle as claimed in claim 2, wherein said chamber is fluidly connected to a source of fluid at a selected pressure on both sides of said piston, so that fluid pressure on each side of said piston can be controlled to control movement of said piston.

14. A nozzle as claimed in claim 2, wherein said tip piece is removably attached to said upstream portion of said valve pin.

15. A nozzle as claimed in claim 2, wherein said valve pin further includes a retainer, wherein said retainer removably attaches said tip piece to said upstream portion of said valve pin, and said retainer has a threaded portion for mating with a corresponding threaded portion on said upstream portion of said valve pin.

16. A nozzle for an injection molding apparatus, said injection molding apparatus including a mold block, said mold block defining at least one mold cavity having a gate, said nozzle comprising:
 a nozzle body, said nozzle body defining a nozzle body melt channel that is adapted to be in fluid communication with and downstream from a melt source and that is adapted to be in fluid communication with and upstream from said gate;
 a valve pin, said valve pin including an upstream portion, said upstream portion defining a valve pin melt channel, wherein said valve pin melt channel has an inlet and at least one outlet, wherein said inlet and said at least one outlet are in fluid communication with said nozzle body melt channel, said valve pin further includes a tip piece connected to said upstream portion, and wherein said valve pin is movable in said nozzle body melt channel to control melt flow through said gate;
 an actuator operatively connected to said valve pin to move said valve pin; and
 a heating element that is embedded within said upstream portion of said valve pin.

17. A nozzle as claimed in claim 16, wherein said valve pin is movable between an open position wherein said tip piece is spaced from said gate to permit melt flow through said gate, and a closed position wherein said tip piece cooperates with said gate to prevent melt flow through said gate.

18. A nozzle as claimed in claim 17, wherein said heating element surrounds said valve pin melt channel.

19. A nozzle as claimed in claim 17, wherein said heating element includes an electrically conductive film.

20. A nozzle as claimed in claim 19, wherein said heating element is at least partially covered by a protective sleeve.

21. A nozzle as claimed in claim 17, wherein said heating element includes an electrically conductive wire element.

22. A nozzle as claimed in claim 21, wherein said valve pin has an outer surface, and said wire element is embedded in said outer surface.

23. An injection molding apparatus, comprising:
a mold block defining at least one mold cavity having a gate;
at least one nozzle, each said nozzle including a nozzle body, a valve pin, an actuator, a first heating element and a second heating element,
wherein said nozzle body defines a nozzle body melt channel that is adapted to be in fluid communication with and downstream from a melt source and that is in fluid communication with and upstream from said gate,
wherein said valve pin includes an upstream portion, said upstream portion defines a valve pin melt channel, said valve pin melt channel has an inlet and at least one outlet, wherein said inlet and said at least one outlet are in fluid communication with said nozzle body melt channel, said valve pin further includes a tip piece connected to said upstream portion, and wherein said valve pin is movable in said nozzle body melt channel to control melt flow through said gate,
wherein said actuator is operatively connected to said valve pin to move said valve pin,
wherein said first heating element is thermally connected to said upstream portion of said valve pin,
and wherein said second heating element is thermally connected to said nozzle body.

24. An injection molding apparatus as claimed in claim 23, wherein said valve pin is movable between an open position wherein said tip piece is spaced from said gate to permit melt flow through said gate, and a closed position wherein said tip piece cooperates with said gate to prevent melt flow through said gate.

25. An injection molding apparatus as claimed in claim 24, wherein said second heating element is positioned downstream from said upstream portion of said valve pin.

26. An injection molding apparatus as claimed in claim 24, wherein a portion of said nozzle body melt channel is heated by both said first and second heating elements.

27. An injection molding apparatus as claimed in claim 24, wherein said first heating element surrounds said valve pin melt channel.

28. An injection molding apparatus as claimed in claim 24, wherein said second heating element surrounds said nozzle body melt channel.

29. An injection molding apparatus as claimed in claim 24, wherein said first heating element surrounds said valve pin melt channel, and wherein said second heating element surrounds said nozzle body melt channel.

30. An injection molding apparatus as claimed in claim 24, further comprising a third heating element connected to said nozzle body.

31. An injection molding apparatus as claimed in claim 30, wherein said first, second and third heating elements are adapted to heat substantially the entire length of said nozzle.

32. An injection molding apparatus as claimed in claim 30, wherein said third heating element is positioned at least partially upstream from said upstream portion of said valve pin when said valve pin is in said closed position.

33. An injection molding apparatus as claimed in claim 24, wherein said first heating element is embedded within said upstream portion of said valve pin.

34. An injection molding apparatus as claimed in claim 24, wherein said actuator includes a piston that is movable within a chamber, wherein said piston is operatively connected to said valve pin so that movement of said piston within said chamber causes movement of said valve pin between said open and closed positions.

35. An injection molding apparatus as claimed in claim 34, wherein said chamber is fluidly connected to a source of fluid at a selected pressure on either side of said piston, so that fluid pressure on either side of said piston can be controlled to control movement of said piston.

36. An injection molding apparatus as claimed in claim 24, wherein said tip piece is removably attached to said upstream portion of said valve pin.

37. An injection molding apparatus as claimed in claim 24, wherein said valve pin further includes a retainer, said retainer removably attaches said tip piece to said upstream portion of said valve pin, and said retainer has a threaded portion for mating with a corresponding threaded portion on said upstream portion of said valve pin.

38. An injection molding apparatus, comprising:
a mold block defining at least one mold cavity having a gate;
at least one nozzle, each said nozzle including a nozzle body, a valve pin, an actuator, and a heating element,
wherein said nozzle body defines a nozzle body melt channel that is adapted to be in fluid communication with and downstream from a melt source and that is in fluid communication with and upstream from said gate into one of said mold cavities,
wherein said valve pin includes an upstream portion, said upstream portion defines an valve pin melt channel, wherein said valve pin melt channel has an inlet and at least one outlet, wherein said inlet and said at least one outlet are in fluid communication with said nozzle body melt channel, said valve pin further includes a tip piece connected to said upstream portion, and wherein said valve pin is movable in said nozzle body melt channel for controlling melt flow through said gate,
wherein said actuator is operatively connected to said valve pin to move said valve pin,
and wherein said heating element is embedded within said upstream portion of said valve pin.

39. An injection molding apparatus as claimed in claim 38, wherein said valve pin is movable between an open position wherein said tip piece is spaced from said gate to permit melt flow through said gate, and a closed position wherein said tip piece cooperates with said gate to prevent melt flow through said gate.

40. An injection molding apparatus as claimed in claim 39, wherein said heating element surrounds said valve pin melt channel.

41. An injection molding apparatus as claimed in claim 39, wherein said heating element includes an electrically conductive film.

42. An injection molding apparatus as claimed in claim 41, wherein said heating element is at least partially covered by a protective sleeve.

43. An injection molding apparatus as claimed in claim 39, wherein said heating element includes an electrically conductive wire element.

44. An injection molding apparatus as claimed in claim 43, wherein said valve pin has an outer surface, and said wire element is embedded in said outer surface.

45. A nozzle for an injection molding apparatus, said injection molding apparatus including a mold block, said mold block defining at least one mold cavity having a gate, said nozzle comprising:
a nozzle body, said nozzle body defining a nozzle body melt channel that is adapted to be in fluid communication with and downstream from a melt source and that is adapted to be in fluid communication with and upstream from said gate;

a valve pin, wherein said valve pin is movable in said nozzle body melt channel to control melt flow through said gate; and a heating element that is embedded within said valve pin.

46. A nozzle as claimed in claim 45, wherein said valve pin is movable between an open position wherein said a tip piece of said valve pin is spaced from said gate to permit melt flow through said gate, and a closed position wherein said tip piece cooperates with said gate to prevent melt flow through said gate.

47. A nozzle as claimed in claim 46, wherein said heating element is at least partially covered by a protective sleeve.

48. A nozzle as claimed in claim 46, wherein said heating element includes an electrically conductive wire element.

49. A nozzle as claimed in claim 48, wherein said valve pin has an outer surface, and said wire element is embedded in said outer surface.

50. An injection molding apparatus, comprising:

a mold block defining at least one mold cavity having a gate;

at least one nozzle, each said nozzle including a nozzle body, a valve pin and a heating element, wherein said nozzle body defines a nozzle body melt channel that is adapted to be in fluid communication with and downstream from a melt source and that is in fluid communication with and upstream from said gate into one of said mold cavities, wherein said valve pin is movable in said nozzle body melt channel for controlling melt flow through said gate, and wherein said heating element is embedded within said valve pin.

51. An injection molding apparatus as claimed in claim 50, wherein said valve pin is movable between an open position wherein said a tip piece of said valve pin is spaced from said gate to permit melt flow through said gate, and a closed position wherein said tip piece cooperates with said gate to prevent melt flow through said gate.

52. An injection molding apparatus as claimed in claim 51, wherein said heating element is at least partially covered by a protective sleeve.

53. An injection molding apparatus as claimed in claim 51, wherein said heating element includes an electrically conductive wire element.

54. An injection molding apparatus as claimed in claim 53, wherein said valve pin has an outer surface, and said wire element is embedded in said outer surface.

* * * * *